July 31, 1923.
H. P. EANES
DOFFING AND DONNING MECHANISM
Filed March 22, 1921
1,463,462
6 Sheets-Sheet 1.
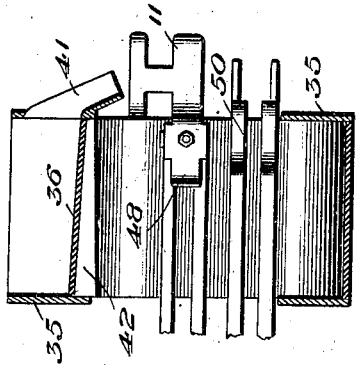
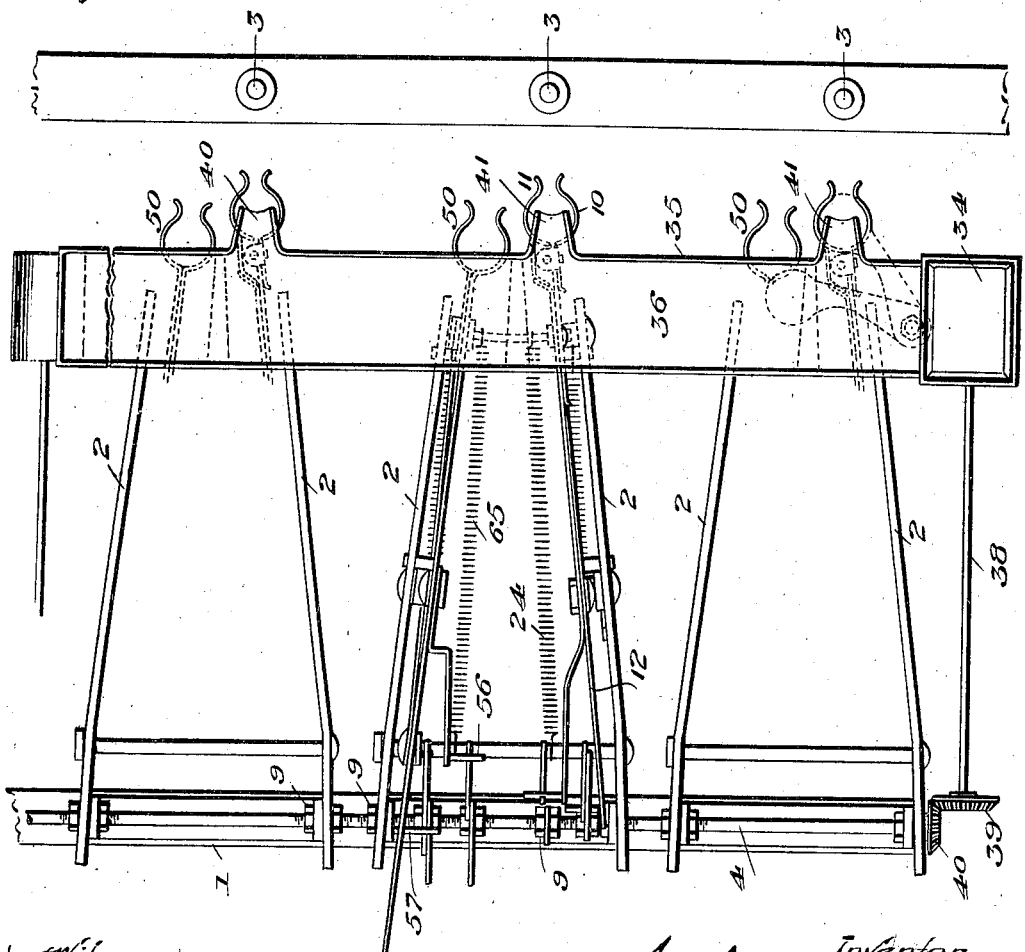

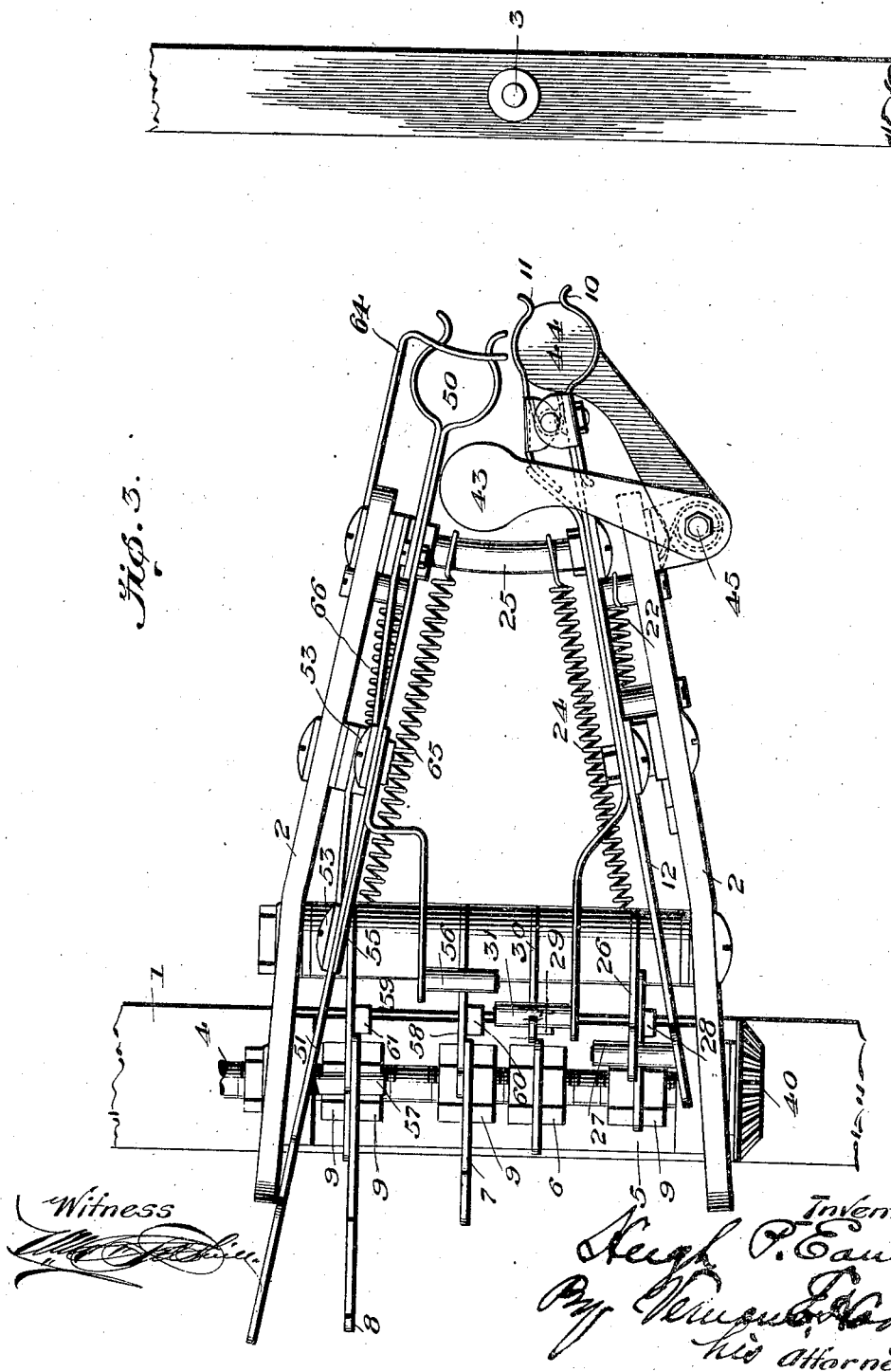

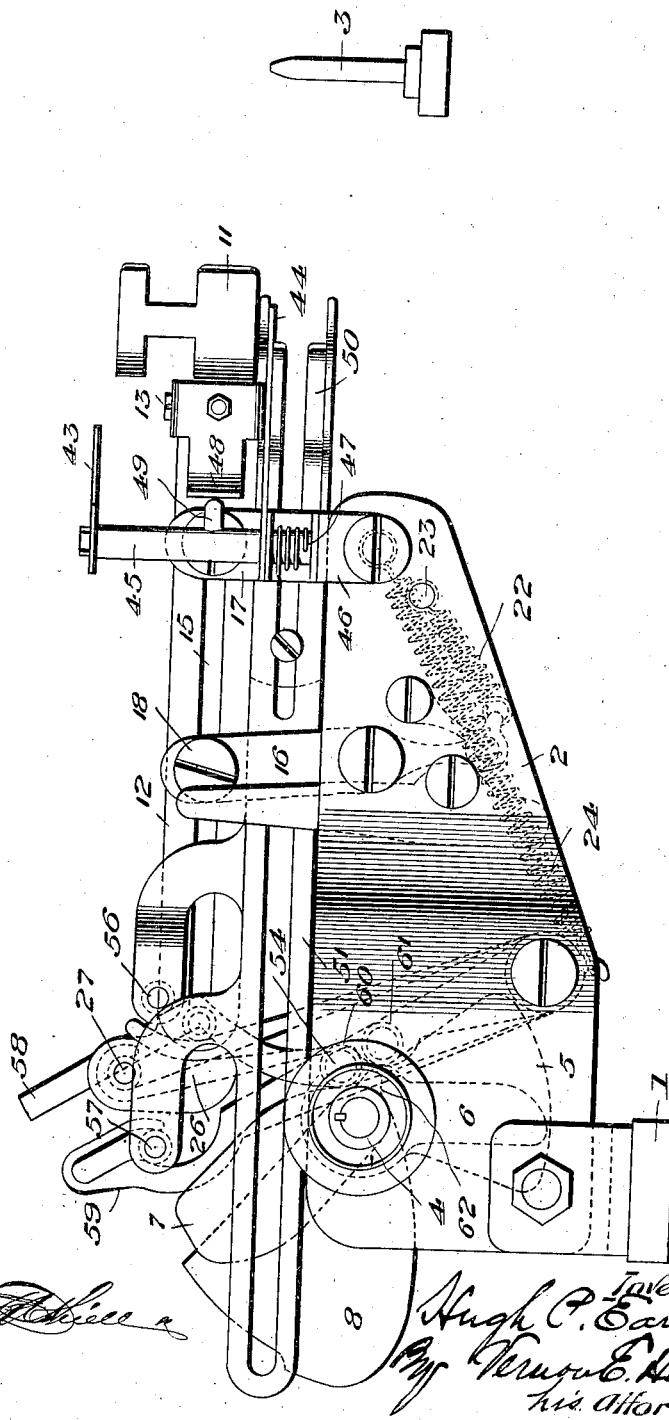

July 31, 1923.

H. P. EANES

DOFFING AND DONNING MECHANISM

Filed March 22, 1921

1,463,462

6 Sheets-Sheet 4

Witness

Inventor
Hugh P. Eanes
By Vernon E. Hodge
his Attorney

July 31, 1923.

H. P. EANES

DOFFING AND DONNING MECHANISM

Filed March 22, 1921 6 Sheets-Sheet 5

1,463,462

Witness

Inventor
Hugh P. Eanes
By Vernon E. Hodges
His Attorney

July 31, 1923.
H. P. EANES
1,463,462
DOFFING AND DONNING MECHANISM
Filed March 22, 1921
6 Sheets-Sheet 6
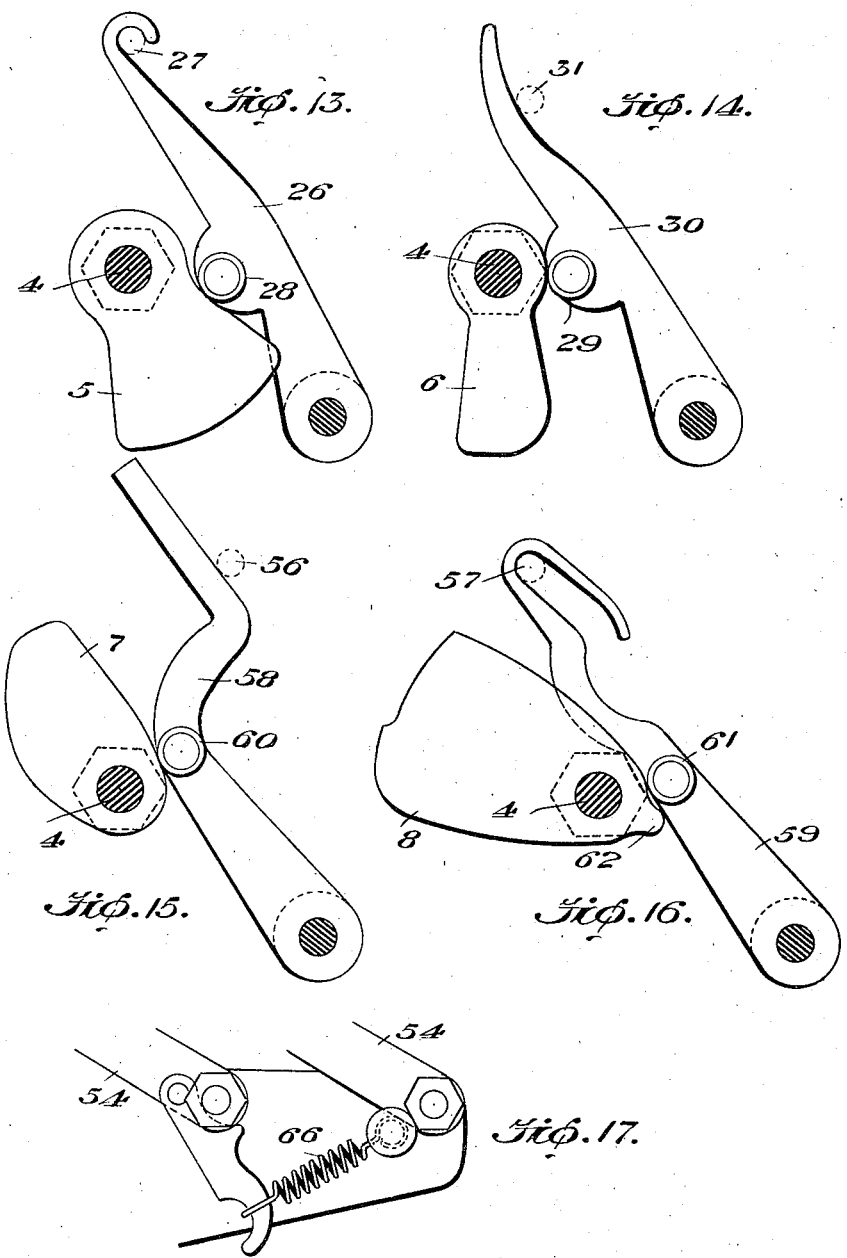

Patented July 31, 1923.

1,463,462

UNITED STATES PATENT OFFICE.

HUGH P. EANES, OF MARTINSVILLE, VIRGINIA, ASSIGNOR, BY MESNE ASSIGNMENTS, TO WILLIAM WARD MILLER, OF MARTINSVILLE, VIRGINIA.

DOFFING AND DONNING MECHANISM.

Application filed March 22, 1921. Serial No. 454,448.

*To all whom it may concern:*

Be it known that I, HUGH P. EANES, a citizen of the United States, residing at Martinsville, in the county of Henry and State of Virginia, have invented certain new and useful Improvements in Doffing and Donning Mechanism, of which the following is a specification.

My invention comprises improvements in doffing and donning mechanism, the principles of which are adapted for embodiment either in attachments to spinning frames or in portable organizations or machines adapted to be carried or moved about from one spinning frame to another, preferably the former.

There are several objects. One is to do by machinery what heretofore has been done only by hand. Another object is to provide means for the automatic feed of empty bobbins or quills to donning appliances whereupon they are placed mechanically upon the spindles upon which they are to be mounted, and another object is to provide means for removing the filled bobbins or quills from the said spindles and conveying them away. Another object is to provide a machine of simple mechanism which will accomplish all of this with the fewest possible number of parts and with the least expenditure of power.

Figure 5:
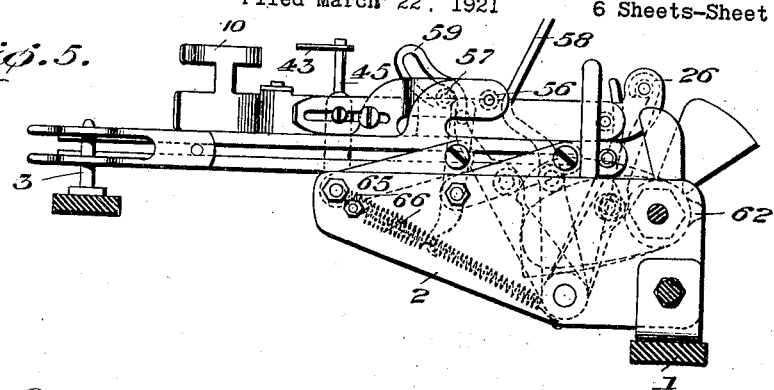
Figure 6:
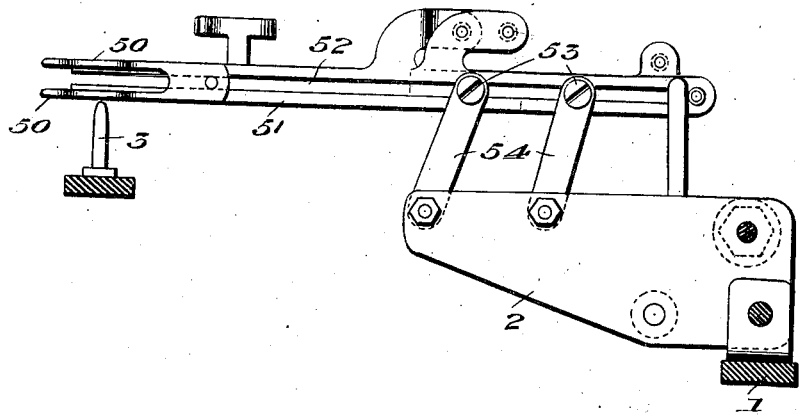
Figure 7:
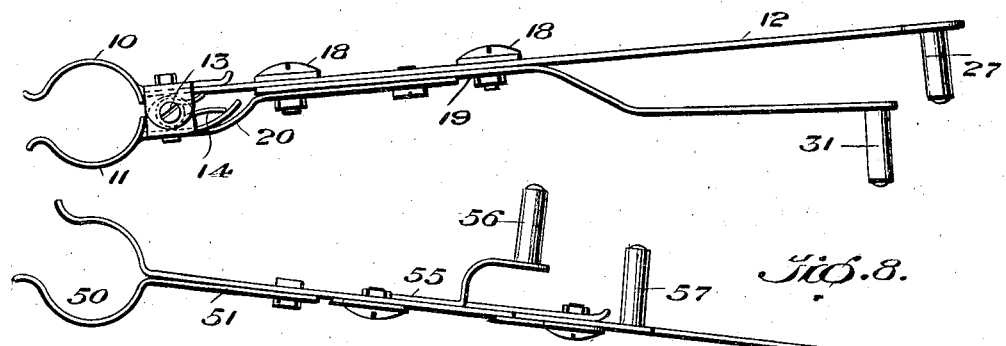
Figure 8:
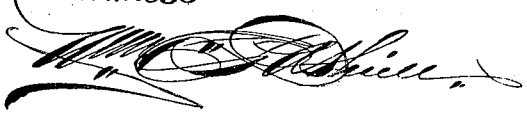
Figure 9:
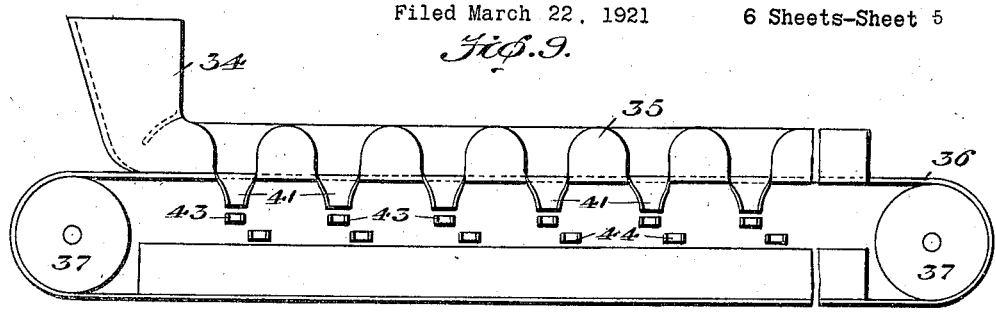
Figure 10:
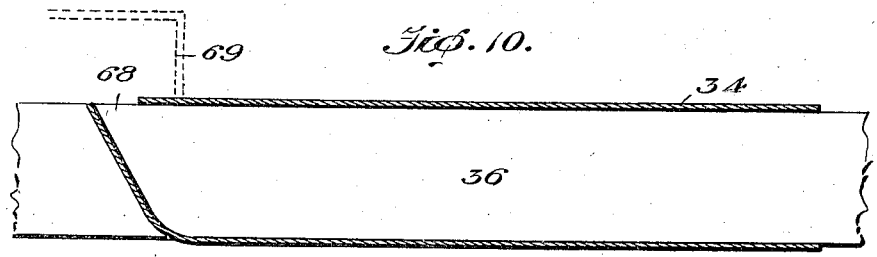
Figure 11:
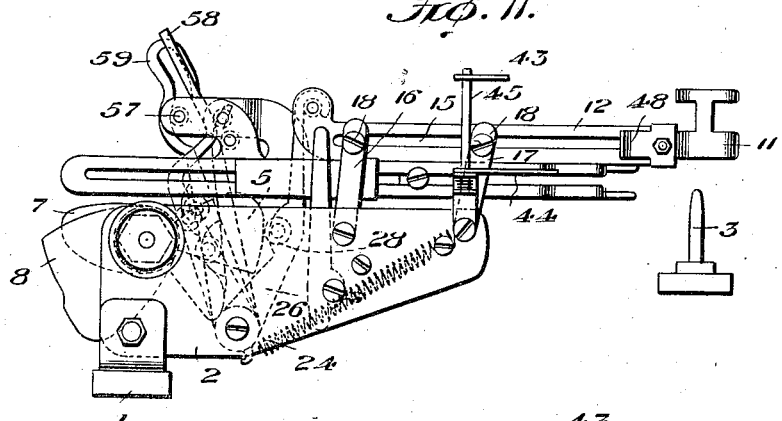
Figure 12:
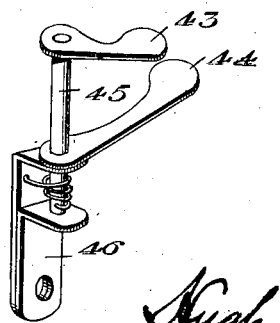

In the accompanying drawings,

Figure 1, is a plan view of a portion of a machine, showing three spindles with cooperating donners and doffers, the center one with more or less of its mechanism for actuating the parts, Figure 2, is an enlarged transverse section through the feed trough and belt, Figure 3, is an enlarged fragmentary view of one unit of the mechanism, Figure 4, is a view of the same from the side, Figure 5, is a view on a smaller scale, from the opposite side of the machine, showing the doffer in position to remove a bobbin or quill, Figure 6, is view of some of the same parts from the same side but with the position changed to one where the doffer is leaving the spindle which holds the bobbin or quill, Figure 7, is a plan view of a donner and its arm, Figure 8, is a similar view of a doffer and its arm, these two figures showing the general relation of these two parts, Figure 9, is a front elevation showing the trough and belt which extends transversely at the front of the machine with which the doffing and donning mechanism is employed, Figure 10, is a plan view showing the belt, Figure 11, is a view of the scale of Figures 5 and 6, taken from the opposite side of the machine and showing the parts in position for the donner to drop a bobbin or quill on a spindle, and Figure 12, is a view in perspective of the bobbin or quill control.

Figs. 13 to 16, inclusive, are detail views showing mainly the cam and lever arrangements of the machine.

Fig. 17 is a detail view of the rockers 54, 54, and certain associated parts.

The doffing and donning appliances, as many as required, are arranged in batteries of as many units as required for the work, all operated by a single shaft, but as these machines or units are all alike only one will, for the most part, be described.

The numeral 1, represents the base, and 2, represents brackets, of which there are two for each unit. These are rigidly secured at one end and they converge toward the other end in the general direction of the spindle 3. These brackets 2, form support for all of the working parts of the machine. A main cam shaft 4, is journalled in these brackets directly above the base. There are four of these cams, namely 5, 6, 7, and 8, and these are held adjustably in position on the shaft, by means of nuts 9, which are adapted to be screwed up tight against either side of the cams, on the threads of the shaft 4. The office of these cams will be fully explained hereinafter.

The donner consists preferably of two jaws 10, and 11 carried on the outer end of the arm 12. Jaw 10, is fixed to the outer end of the arm and the jaw 11, is pivoted on a pin 13, and a spring 14, normally holds these jaws closed, as shown in Figure 3, which is the position when gripping a bobbin or quill. The arm 12, is slotted nearly throughout its entire length by a slot 15. Two rocker arms 16, and 17, are pivotally mounted on the inner side of one of the brackets 2, and rivets 18, extend through the upper ends of these rockers, through the slot 15, and are secured to the plate 19, which extends parallel with the arm and in contact with it for a portion of its length, as shown in Figure 7, the forward end 20, however forming a trip, in position to engage a projection 21, on the rear end of the pivoted jaw 11, when the bobbin or quill is to be dropped from the donner, which is the position of parts shown in Figure 7. A stiff spring 22, extends from the lower end of rocker 16, to a stud 23, on the bracket 2, for restoring the rockers to their upright or normal position, and a spring 24, extends from some point at the forward end of the machine, for example the cross bolt 25, to the lower end of the tappet 26, which has the effect of pulling the upper end of the tappet back, and with it the arm 12, as the upper or free end of the tappet is hooked around a stud 27, which projects laterally from the rear end of the arm 12. This tappet 26, has the double function of pushing and pulling the arm 12. It has an anti-friction roller 28, on one side in the path of the cam 5, so that as the latter makes a revolution, it swings the tappet forward against the stud 27, against the tension of the spring 24, and into the position shown in Figure 11. With the further rotation of the cam shaft 4, the concentric portion of the cam 5, traverses or turns upon the roller 28, and during this transit which holds the donner in this position shown in Figure 11, the cam 6, commences to brush against the roller 29, on the side of a second tappet 30, pushing it forward against a laterally projecting stud 31, on the plate 19. This has the effect of sliding the plate 19, forward and by tilting the rockers 16, and 17, it lowers the donner, over the spindle 3. A trip 32, is formed on the forward end of plate 19, and this trip is thrust against the tongue 33, on the pivoted jaw 11, thereby opening the jaw and releasing the bobbin or quill upon the spindle 3. The further turning of the cam shaft withdraws cam 5, from the path of the tappet 26, and moves cam 6, from the roller 29, on the second tappet 30, whereupon the spring 24, which has been placed under tension, immediately returns the donner, plate and rockers to their normal positions, or in place for the donner to receive another bobbin or quill, preparatory to its delivery to the spindle.

The bobbins or quills are fed to a whole battery of donners from a hopper 34, through a trough 35, upon a moving belt 36, the latter travelling over rollers 37, one of which is driven by the shaft 38, through bevel gears 39, and 40, from the main cam shaft 4, on one end of which the latter gear is keyed.

There is a spout 41, leading from the forward side of the trough for each donner, and a tapering or conical roller 42, beneath the belt 36, opposite each spout, causes the discharge of the bobbins or quills into these spouts and thence into the donner if below as in Figure 1. Two gates 43, and 44, are secured to a common shaft 45, one above and the other below, the plane of the donner, and one of these gates, namely 44, closes the bottom of the donner, when the latter is in position to receive a quill as shown in Figures 1, and 4, and the upper gate 43, is designed to close the spout 41, while the donner is carrying its bobbin or quill to the spindle 3. So these two gates operate simultaneously but they alternately close the bottom of the donner and spout. The shaft 45, is supported in a bracket 46, on the outer end of one of the main brackets 2. A spring 47, normally rocks the shaft 45, to swing the gates 43, beneath the spouts as shown in Figure 9. The moment the donner recedes from the spindle 3, a stop 48, on its side strikes a stud 49, on the shaft 45, and turns the shaft 45, part way around, swinging the gate 43, from beneath the spout and gate 44, beneath the donner, thus providing a temporary bottom for it, while receiving another bobbin or quill, and until the donner starts forward, when the tongue 33, on the movable jaw 11, leaves the trip 32, and the jaw closes upon the bobbin or quill and the gate 43 swings beneath the spout 41, above, thus holding back the bobbins or quills until the donner is again empty and back in place to receive another bobbin or quill.

The doffer is in the form of a pair of spring jaws 50. These are on the outer end of an arm 51, which has a slot 52 extending nearly its entire length, which receives the screws 53 which extend therethrough from the upper ends of the rockers 54, which latter are pivoted at their lower ends to one of the brackets 2, as shown in Fig. 6. These screws after extending through slot 52 are connected to a plate 55, and from this plate a stud 56 extends laterally, and another stud 57 extends laterally from the rear end of the arm itself. These two studs are in the path of tappets 58 and 59 respectively, and these tappets have anti-friction rollers 60 and 61 thereon in the path of the cams 7 and 8 on the main shaft 4, so that the several cams on the camshaft are so arranged and timed with respect to one another that the donner and doffer alternate, one in order to place the bobbin or quill upon the spindle 3, and the other to remove it therefrom. The cam 7 follows the cam 8, the cam 8 with the tappet 59 moving the doffer in and out, and the cam 7 and its tappet 58 causing the doffer to lift the bobbin or quill upwardly away from the spindle after grasping it between the spring-jaws 50.

A small cam 62 gives a slight forward movement to the doffer to slacken the thread, while the donner is placing the bobbin or quill upon the spindle 3. This cam 62 is located in line with and opposite the cam 8.

A stripper 64 is secured to bracket 2 in position to strip the bobbin or quill from the doffer when the latter resumes its rearward or normal position.

A spring 65 holds these parts under tension, and a spring 66 extends from the lower end of one of the rockers 54 to a point on the bracket 2 to assist in returning the doffer to its normal position.

From the doffer, the bobbins or quills are dropped to the lower portion of the belt 36, and thence out through an opening 68 (see Fig. 10).

Thus it will be seen that the entire operation is automatic, namely that the bobbins or quills are fed into the donner, deposited by the latter on the spindle, then wound or spooled, this latter operation being old and well-known and not shown, then removed by the doffer and dropped upon the belt and conveyed to a receptacle 69 therefrom.

The cam-shaft 4 is actuated intermittently in any approved manner, and these donners and doffers are arranged in pairs and in batteries of as many as required to do the work, all being actuated by the common cam-shaft 4.

I claim:

1. Doffing and donning mechanism comprising a doffer adapted to engage a full quill preliminary to removal of the full quill from a spindle, a donner adapted to carry an empty quill for application of the empty quill to such spindle, and cams whereby the doffer is actuated to effect such removal of the full quill and whereby the donner is actuated independently to place the empty quill upon the spindle.

2. Doffing and donning mechanism comprising a doffing clamp, cams for actuating the same to engage a full quill on a spindle, raise the said quill to doff it from the spindle, and then withdraw and discharge the full quill, a donning clamp adapted to clasp an empty quill, and cams for actuating said clamp independently into position to place said empty quill over a spindle, then depress the same to don the quill upon the spindle, and then withdraw, disengaging from the empty quill.

3. In combination, doffing devices comprising a carrier-member provided with a doffing clamp, means by which said member is advanced to engage a full quill mounted upon a spindle, then raised to doff such quill, and then withdrawn, and donning devices comprising a carrier-member provided with a fixed clamp member and with a co-acting movable clamp member, an actuator for said movable clamp member, movably connected with said carrier-member, means by which such actuator is operated to bring about opening and closing of the movable clamp member, and means by which the carrier-member is advanced toward the spindle, lowered to place the empty quill upon the spindle, and then withdrawn.

4. Doffing and donning mechanism having combined with the doffing and donning devices thereof a conveyor which conveys empty quills into position to be taken by the donning devices, receives the doffed quills from the doffing devices, and conveys them away.

5. The combination of a quill-supplying station, and a conveyor which receives empty quills at such station, delivers them to the donning devices, receives the doffed full quills from the doffing devices, and conveys them away, with donning devices by which empty quills supplied by the said conveyor are placed upon spindles, and doffing devices which deliver the doffed quills to the conveyor.

6. The combination with doffing and donning devices cooperating with a series of spindles, of a quill-supply station, and an endless traveling conveyor receiving empty quills from said station, surrendering them to the donning devices and receiving full quills from the doffing devices, and discharging the full quills at a discharging point.

7. A traveling quill-carrier, ranging lengthwise of a series of spindles, by which empty quills are delivered at positions corresponding respectively with those of the respective spindles upon which they are to be placed.

8. The combination of a quill-supplying station, and a movable conveyor which receives empty quills at such station and transports them to positions for transfer to a series of spindles, with donning devices for transferring such quills to the said spindles.

9. In combination, a movable conveyor transporting a series of empty quills to points corresponding with the spindles of a series, and donning devices by which such quills are applied to the said spindles.

In testimony whereof I affix my signature.

HUGH P. EANES.